July 25, 1939.　　　R. H. UPSON　　　2,167,558
SELF-TAPPING BOLT
Filed June 24, 1937　　　2 Sheets-Sheet 1
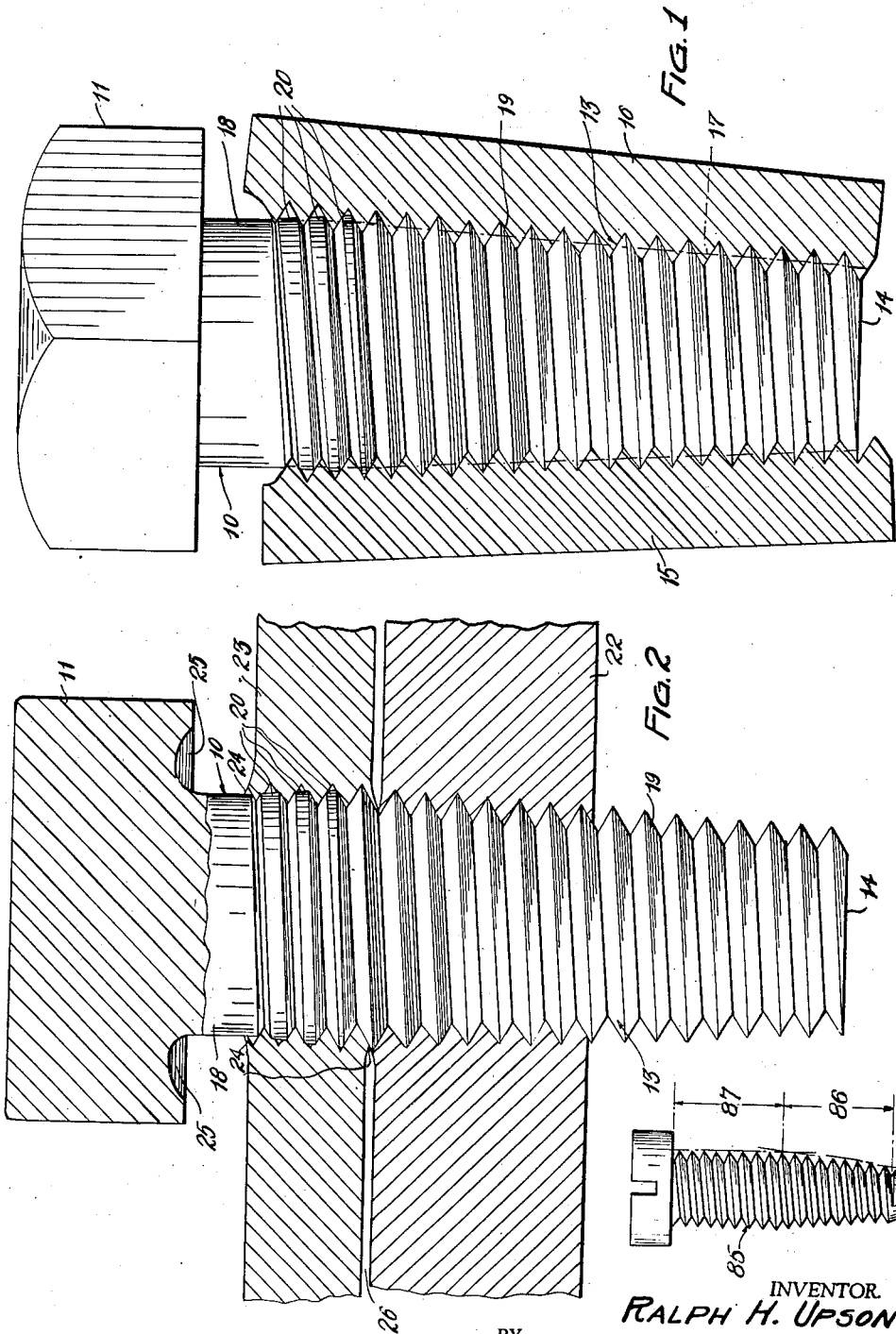
INVENTOR.
RALPH H. UPSON
BY Kwis Hudson & Kent
ATTORNEYS

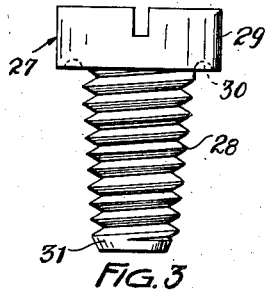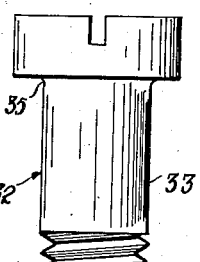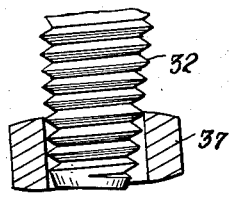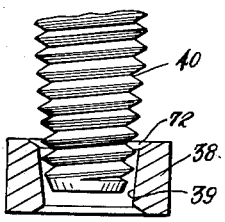
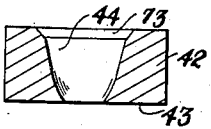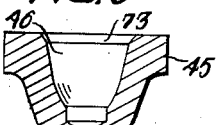
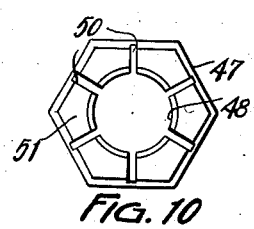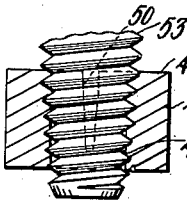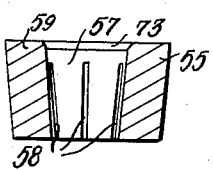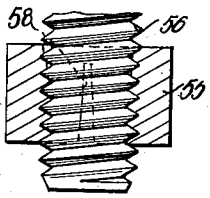
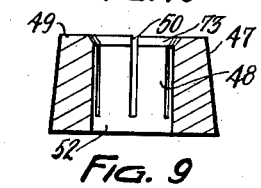
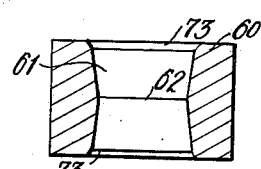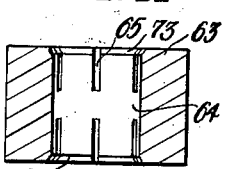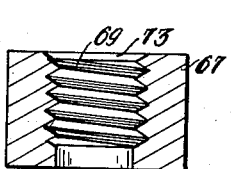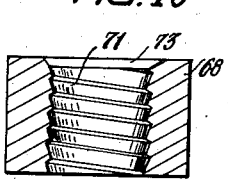
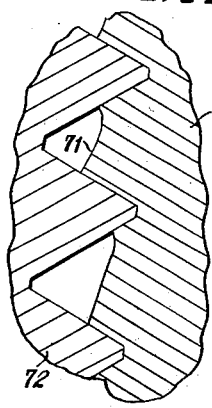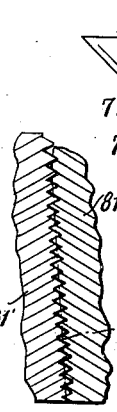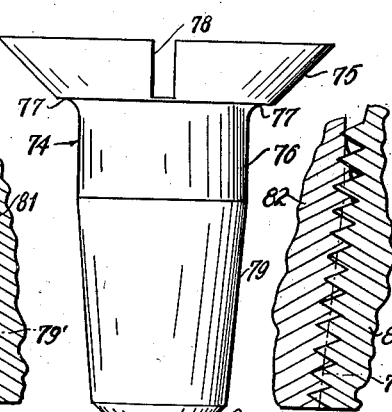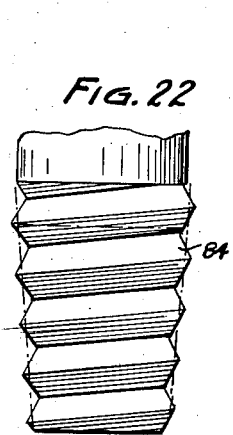
INVENTOR.
RALPH H. UPSON
BY
ATTORNEYS Patented July 25, 1939

2,167,558

UNITED STATES PATENT OFFICE 2,167,558

SELF-TAPPING BOLT

Ralph H. Upson, Ann Arbor, Mich., assignor to The Lamson & Sessions Company, Cleveland, Ohio, a corporation of Ohio Application June 24, 1937, Serial No. 150,088

9 Claims. (Cl. 85—46)

This invention relates to a bolt or screw of the type commonly known as self-tapping, that is to say, a bolt or screw which is adapted to be used with an unthreaded nut or to be used in an unthreaded hole in metal or other hard material.

So-called self-tapping screws as heretofore made and used have generally been provided with a cylindrical threaded main portion constituting a substantial portion of the length of the stem of the screw and which merges into a tapered portion adjacent the tip of the screw. This tapered tip portion in some cases extends to a point and in other cases is terminated by a blunt cut-off. In all of the prior forms of self-tapping screws with which I am familiar, the main cylindrical portion of the stem is provided with complete threads of full depth. When the threading of this main portion of the stem of the screw is done by the customary flat rolling dies set parallel to each other, the threads are caused to be formed less perfectly as they extend down on the tapered tip. In other cases the threading dies, instead of being flat, are specially curved to conform with the tip shape so as to produce essentially full threads throughout both the cylindrical main stem portion and the tapered tip portion. These prior forms of self-tapping screws have several disadvantages among which are the tendency for the screw to cant or tilt when it is being started into a hole and the tendency for the screw to loosen by unscrewing.

A primary purpose of my invention is to produce a novel self-tapping screw which overcomes the disadvantages of these prior screws and which is suitable for use either with an unthreaded nut or in an unthreaded hole in metal or other hard material.

Another object of my invention is to provide an improved self-tapping screw which will stay tight by the pressure or friction of the threads of the nut or other part into which the screw has been inserted.

A further object of my invention is to provide an improved self-tapping screw or bolt embodying novel features facilitating the formation of strong, tight joints and also embodying novel features favoring economical production of the principal parts of the connecting means involved in such joints.

Other objects and advantages of my invention will be apparent from the following description when taken in conjunction with the accompanying sheets of drawings in which the proportions of the various parts are somewhat exaggerated to better illustrate the invention.

Fig. 1 is a transverse sectional view taken through a pair of thread rolling dies and showing one form of my novel self-tapping screw therebetween;

Fig. 2 is a sectional view taken through a joint formed with my improved self-tapping screw as the connecting means;

Fig. 3 is a side elevation of another form of my self-tapping screw;

Fig. 4 is a longitudinal sectional view taken through an unthreaded nut and showing another form of my self-tapping screw in elevation and entering the nut;

Fig. 5 is a view similar to the lower portion of Fig. 4 and illustrating the extent to which the screw can tilt in the opening of the nut;

Fig. 6 is a longitudinal sectional view taken through another form of unthreaded nut and showing my improved screw entering the nut opening;

Fig. 7 is a longitudinal sectional view taken through another form of unthreaded nut;

Fig. 8 is a longitudinal sectional view taken through another unthreaded nut;

Fig. 9 is a longitudinal sectional view taken through an unthreaded axially-slotted nut;

Fig. 10 is a plan or end view thereof;

Fig. 11 is another longitudinal sectional view taken through the slotted nut of Fig. 9 but showing the same expanded by my self-tapping screw entering the opening thereof;

Fig. 12 is a longitudinal sectional view taken through another form of slotted unthreaded nut;

Fig. 13 is a view similar to that of Fig. 11 showing a self-tapping screw engaging in the opening of the slotted nut of Fig. 12;

Fig. 14 is a longitudinal sectional view taken through an unthreaded double-tapered nut;

Fig. 15 is a similar sectional view taken through an unthreaded nut which is slotted from opposite ends;

Fig. 16 is a longitudinal sectional view taken through a nut having a partially threaded opening;

Fig. 17 is a similar sectional view taken through another partially threaded nut;

Fig. 18 is a partial sectional view showing, on an enlarged scale, the engagement of the threads of my self-tapping screw with the partially formed threads of the nut of Fig. 17;

Fig. 19 is a side elevation of a screw blank with a different type of head;

Fig. 20 is a partial sectional view showing screw threads which may be formed on the blank of Fig. 19;

Fig. 21 is a similar sectional view showing coarser screw threads which may be formed on the blank of Fig. 19;

Fig. 22 is a partial elevational view showing a screw which may be produced by providing the blank of Fig. 19 with a modified form of thread, and Fig. 23 is a side elevation of a screw similar to that of Fig. 4 but with the cylindrical portion of the stem also threaded.

More detailed reference will now be made to the accompanying drawings in which I have illustrated several different embodiments of my self-tapping screw or bolt, and have also shown several forms of nuts which may be used with such screw or bolt. However, before proceeding with the detailed description, I desire it to be understood that my invention is not limited to the particular articles herein disclosed but may be embodied in various other articles of manufacture of the general character here under consideration.

In Figs. 1 and 2 of the drawings I show a screw 10 which represents one form of the novel self-tapping screw or bolt of my invention. This screw may have a head 11 of polygonal form, in this instance hexagonal, and a stem or shank having a main threaded portion 13 constituting a substantial portion of the length of the stem. An important feature of this threaded main portion is that it is tapered throughout its length and the threads are full-formed, that is, are complete threads of full depth which may extend to the extreme tip 14 of the screw. For best results the taper of this main threaded portion should be such that the angle included between the opposite sides of the screw is at least 3° but does not exceed 10° although the taper may be varied within these limits.

The threading of the stem of the screw 10 may be done by a rolling operation performed between cooperating flat dies 15 and 16 which are set or inclined relative to each other at substantially the angle which is to be the included angle of the main tapered portion of the finished screw. I have indicated by the broken line 17 in Fig. 1 the outline of the stem portion of the blank being operated upon by the dies 15 and 16; and, as will be seen from the portion outlined by this broken line, the blank has a tapered main stem portion constituting a substantial portion of the length of the stem and a cylindrical portion 18 connecting the large end of the tapered portion with the head 11. During the rolling operation, threads 19 of full depth are formed on the tapered main portion of the stem by the dies. The cylindrical upper portion 18 of the blank can be left unthreaded or, if desired, the dies 15 and 16 can be extended beyond the large end of the tapered main portion and toward the head of the blank, as illustrated in Fig. 1, so that during the rolling operation they will partially indent this cylindrical portion to form the incomplete or partially formed threads 20 thereon. These incomplete or partially formed threads 20 provide the equivalent of a reverse taper on this section of the finished screw. The outer extremities of these partially formed threads taper toward the head of the screw at an angle substantially equal to that of the taper of the threaded main portion 13.

After the threads of my improved self-tapping screw or bolt have been formed thereon the article is hardened by cyaniding, or any other suitable hardening process, so that the screw will be harder than the material which it will enter.

When a screw of this character enters a hole in metal or similar material, it indents or presses threads into the body containing the hole by displacing material from the space occupied by the hardened threads of the screw itself. Part of this displaced material at first goes into the unfilled interstices or grooves between the threaded convolutions of the screw but some of the displaced metal is also forced to the surface of the body where it forms burrs 24 as indicated in Fig. 2. It will be seen from the connection illustrated in Fig. 2 that the principal burr thus formed is on the face of the body 23 nearest the head 11 of the screw. To accommodate this burr and to facilitate the formation of a tight joint without damage to the screw, I may provide the underside of the head 11 with an annular recess 25.

Although experiments have shown that my novel screw 10 enters material more readily than other forms of self-tapping screws, still a small burr will be formed, and it is impossible in all cases to prevent the screw from turning a small amount as the tip emerges from the underside of the part 23 and before its threads take hold of the second part 22. If it is not feasible to put a clearance hole in the near part of the joint, or if the two parts to be connected cannot be turned relative to each other, a gap 26 results between them which can ordinarily only be closed by screwing down tightly enough to cause some slippage or stripping between the threads of the screw and the outer part 23. This slippage is very difficult to obtain after pressure has been built up unless the outer part 23 is very thin compared to the effective depth of the part nearest the tip of the screw. This slippage and the resultant taking up of the gap 26 is facilitated in my improved screw, first, by the relatively incomplete threads 20 provided nearest the head; and second, by the annular recess 25 formed in the under surface of the head. When the screw is tightened down to complete the connection being formed, the recess 25 of the head not only accommodates the burr 24, but also by the annular bearing engagement with the surface of the outer part 23, tends to force parts 22 and 23 together. For any gap too large to be handled in this way, the partially formed threads 20 permit of the desired slippage between the screw and the part 23 to cause the space 26 to be taken up and the latter part to be firmly pressed against the part 22 without at the same time introducing any lateral looseness. It will be found that in connections formed by the use of my improved screw 10, and in the manner just described, a strong frictional engagement will result from the wedging effect produced on the thread faces and this frictional engagement will firmly hold the screw against accidental unscrewing and loosening.

In addition to the above described characteristics of my novel screw it will be noted that the full-threaded tapered main portion 13 has a length at least equal to the diameter at the large end thereof. Since the maximum thickness of material, with which a given screw of my novel construction will be used, will usually not exceed the major diameter of the screw stem, it will be seen that the tapered main portion will usually not extend through the material; but it is intended that a substantial portion of the tapered stem shall remain in the material, instead of being screwed entirely beyond as in the case of existing screws with relatively short tapered tips.

In Fig. 3 of the drawings I have shown another form of my self-tapping screw which is especially suitable for use in joints where the outer part is a relatively thin sheet. In the screw 27 here illustrated the cylindrical portion and the reversely tapered portion of the stem have been omitted and the tapered full-threaded stem 28 extends to the underside of the head 29. Unless the outer sheet entered by the screw is provided with an ample clearance hole, it is especially desirable for this fully tapered screw that the underside of the head be provided with an annular recess 30 for accommodating the burr which will be thrown up about the hole which the screw enters. This long, tapered, full-threaded main stem portion 28 may be formed in a manner similar to that explained above in connection with Figs. 1 and 2, and, as to its angle of taper and the relation of its length to its major diameter, its characteristics are similar to those of the screw 10.

Another feature of the screw 27 resides in the formation of the tip 31. This tip, as shown in the drawings, is formed with a short steep taper or bevel having an included angle of at least 20°. The length of the tip should not exceed one-half of the diameter of the stem at the large end of the main tapered portion. The diameter of the beveled tip at its largest point should always be less than the mean major diameter of the screw. The bevel, length and diameter of the tip can each be varied more or less within the limits mentioned. Although the screw 10 of Fig. 1 is shown as having a blunt tip, it will be readily understood that, if desired, it could be provided instead with the beveled tip just described.

In Fig. 4 of the drawings I have shown a modification which is more suitable for longer screws and bolts, such as the screw or bolt 32 here illustrated in which the cylindrical unthreaded stem portion 33 is of considerable length. This cylindrical portion may be of any length desired or appropriate to the service which the screw is to render. The working portion, that is, the threaded main tapered portion 34, and the tip 35 of the screw are similar to the full-threaded main tapered portion and the tip as described above for the screw 27 of Fig. 3. The underside of the head of the screw 32 may also be provided with an annular recess like that of the screw 27, or, if desired, the recess can be omitted and an annular fillet 35' of appropriate radius provided at the junction of the head and stem for increased strength.

All of the self-tapping screws thus far described are suitable for use with an unthreaded nut, as well as with bodies of other forms, and in Fig. 4 I show an example of such use in which the threads of the screw 32 are about to engage and press into the wall of the opening 36 of the nut 37.

I have found that in providing my novel screw with the long taper on the main threaded portion of the stem, the starting of the screwing or self-tapping operation is greatly facilitated by reason of the fact that the screw is more positively held against tilting or canting when first entering the material. I have shown in Fig. 4 the relative positions of the screw 32 and body which it is to enter, in this instance the nut 37, when the screw and body are initially brought into engagement. In Fig. 5 I show the screw 32 and body 36 relatively inclined, but as will be seen from this illustration, the extent to which the screw can tilt or cant is limited by the lateral angle, that is the angle of taper on one side of the entering cone-like portion of the screw.

I have found that if the hole in which the self-tapping screw is to be used is tapered to substantially the same angle as the screw tip, no tilting or canting of the screw will take place. Although a cylindrical hole will be used in many instances because of its ease in drilling, a tapered hole affording this straight-starting advantage can and will be provided in many cases by punching or other operation. Such a tapered hole can be provided with facility in all of the various forms of nuts, and in Fig. 6 of the drawings, I show a nut 38 having a tapered unthreaded opening 39 therein. The angle of the taper of this opening is preferably substantially equal to the angle of taper on my improved self-tapping screw 40 which is shown entering the nut opening. The provision of such a tapered opening in the body or nut gives, in addition to the advantage of straight-starting of the screw, the advantage of a uniform threading of the nut surface after it has been screwed part-way onto the threaded stem. In case the bolt is a little short for the purpose intended, the nut can be reversed and, in this way, made to take hold nearer the bolt tip, though in this case with a sacrifice of straight-starting facility.

In Fig. 7 of the drawings I show a nut 42 of a form which will afford the straight-starting advantage just described for the nut 38 of Fig. 6 and which, in addition, will provide for threads of increased depth adjacent its outer end or face 43. This form of nut is especially intended for cases or instances of use where it is desirable to have the nut held firmly without screwing it for any great distance onto the bolt. I obtain this beneficial result and advantage by making the nut opening 44 of substantially the shape or form illustrated in Fig. 7, that is, with the sides of the opening converging toward the outer face 43 of the nut by a straight-sided taper merging into a curved taper.

In Fig. 8 of the drawings I show an "acorn" type of nut 45 which is a modification of the nut illustrated in Fig. 7 and in which the opening 46 does not extend entirely through the nut. The advantages just explained for the nut 42 are also obtainable from this acorn nut.

In Figs. 9, 10, and 11 I show a modified form of nut 47 having an unthreaded hole 48 of initially cylindrical form and having outer polygonal faces which taper toward the inner end face 49 of the nut. This nut is provided with circumferentially spaced slots or saw-cuts 50 in the wall thereof which extend axially for a substantial portion of the length. These saw-cuts divide the wall of the nut into a plurality of axially extending finger-like portions 51 which remain connected at one end thereof by the annular base portion 52.

In Fig. 11 I show this slotted nut in engagement with the tapered, main threaded portion of my improved self-tapping screw 53. It will be seen that when the nut has been thus applied to the screw 53, the finger portions 51 will be sprung outwardly on the annular base portion 52 with the nut assuming the expanded form shown in this view.

In Figs. 12 and 13 I have shown another form of unthreaded nut 55 and have illustrated its use in connection with a self-tapping screw 56. The nut here shown has an opening 57 therethrough, which is tapered more than the screw 56 and which has its side wall provided with axially extending slots or saw-cuts 58. These slots extend from the face at the small end of the taper to a point adjacent the face at the large end of the taper where the fingers or sections between the slots remain connected to an annular base portion 59. The screw 56, to which this nut may be applied, may be my improved self-tapping screw having a tapered, full-threaded main portion or, as illustrated in this instance, may be a hardened screw of more conventional type having zero taper. When the nut is applied to the screw, the finger portions are sprung out to the expanded condition illustrated in Fig. 13.

Another modified form of nut is shown in Fig. 14. The nut 60 here illustrated is one of symmetrical form which can be applied by presenting either end of the unthreaded nut opening 61 to the self-tapping screw. To enable the nut to be used in this manner, I form the opening 61 thereof of tapered coaxial sections extending into the nut from the opposite ends thereof and communicating with each other substantially on the transverse mid-plane 62.

The nut 63 shown in Fig. 15 represents another modification in which the unthreaded opening 64 is a substantially cylindrical opening and the body of the nut is provided with slots or sawcuts 65 extending part-way thereinto from opposite ends. This nut can also be applied with either end of the nut opening presented to the screw.

In Figs. 16 and 17 I show nuts 67 and 68 which are partially prethreaded and have the advantage that in starting the nut on the screw an initial engagement between the nut and screw will be had before the screw threads begin to indent into the body of the nut. This initial engagement between the threads of the screw and the preformed, or partially formed, threads of the nut reduces the amount of travel of the nut necessary to produce threads of substantially full strength thereon.

The nut 67 illustrated in Fig. 16 has its opening 69 threaded for a substantial portion of its length and has an unthreaded section 70 adjacent the outer face of the nut. When this nut is applied to a self-tapping screw its threads engage with the threads of the screw to immediately provide a starting connection which is completed by the self-tapping screw passing on through the unthreaded section 70 and forming its own threads therein.

The nut 68 shown in Fig. 17 has a partially formed helical thread 71 in the axial opening thereof and extending substantially the full length of the opening. When this nut is applied to a self-tapping screw an initial starting engagement is provided between the nut and screw and the connection therebetween is completed by the screw 72 deepening and reshaping the spiral thread 71 as illustrated on an enlarged scale in Fig. 18.

In a number of the nuts herein illustrated and described I show the nut opening as having a bevel or chamfer 73 at the entrance end thereof. This bevel provides the entrance end of the hole of the nut with an opening which is substantially larger than the tip diameter of the screw. In the case of the nuts of Figs. 14 and 15 which are so formed that either end can be presented to the screw, I provide the bevel 73 at both ends of the nut opening.

In Fig. 19 I have shown a screw blank 74 which provides the basis for a novel screw series and for a modified form of self-tapping screw. The head 75 of the screw blank is of the flat or beveled type, but instead of extending the bevel of the head downwardly to the stem, as is usual in flat headed screws, I provide the annular fillet 77 at the junction of the head and stem. The purpose of this recess is similar to that of the recess shown in the underside of the head in Fig. 1, namely to accommodate the burr which may be thrown up around the hole when the screw is inserted. A transverse screw-driver slot 78, appropriate for this head, is shown as extending through the beveled side wall and as having a depth substantially equal to the axial thickness of the head. The stem portion of this blank has a substantially cylindrical section 76 adjacent the head and a tapered main portion 79 extending from the cylindrical portion to the beveled tip 80.

A screw blank of this form can be provided with either coarse or fine threads, as may be desired, and will fit approximately a hole of a diameter corresponding with the pitch diameter of the screw. This is made possible by forming the screw blank, and the hole therefor, of a diameter approximating that of the medium or pitch diameter of the threads. Thus, regardless of the depth or fineness of the thread formed on the screw blank, the screw will fit approximately in an unthreaded hole or nut of corresponding size.

In Figs. 20 and 21 I show screws 81 and 82 being formed by thread rolling dies 81' and 82' acting on two blanks which are identical with each other and with that of Fig. 19, to thereby provide these screws, respectively, with fine and coarse threads. In providing a screw blank which can be thus used as a standard blank for several different threads of varying coarseness or pitch, or, in other words, as a standard for all of the threads of a series for a given screw diameter, an important economy in production can be realized. In Figs. 20 and 21 the pitch line 79' corresponds with the profile line of the stem of the blank 74 of Fig. 19.

In Fig. 22 I show the tapered portion of this same screw blank provided with a modified form of thread 84 in which the angle at the apex of the thread is considerably flatter than the sharp V-threads illustrated in Figs. 19 and 20. The thread 84 may, as here shown, be one of very shallow depth, but of large pitch. Even though the form of the thread may be changed to the extent indicated in Fig. 22, the same standard screw blank and the same hole size can be retained for a series of screws of a given diameter having threads of different pitch or coarseness.

In Fig. 23 I show a screw 85 which is generally similar to the screw 32 of Fig. 4 but instead of having an unthreaded stem portion it has the thread extending to or adjacent to the head. In this screw the section 86 has a long gradual taper and corresponds with the gradually tapered threaded main portion 34 of the screw 32 of Fig. 4 and the section 87 is a threaded cylindrical portion, the thread of which is a continuation of the thread of the tapered section. This screw differs from the screw of Fig. 2 mainly in that the thread of the cylindrical section 87 is complete and of full depth whereas the thread of the cylindrical portion of the screw 10 is only partially formed.

To summarize some of the general advantages in the use of my novel self-tapping screw or bolt, it will be seen that the long gradual taper makes it easy to insert the screw and hold it straight during starting. This taper also causes a frictional torque to be built up in the threads and which gradually increases to a maximum when the screw is all the way in, in which condition the frictional lock is especially effective in discouraging any tendency for the screw to loosen under vibration. The recess in the underside of the head prevents undue increase of thread pressure during the final tightening and permits perfect contact of the head on the surface of the material in spite of the burr which may be thrown up around the hole. The combination of decreasing thread depth with increasing minor diameter toward the head permits drawing two parts of a joint tightly together without leaving any lateral play or looseness in the part nearest the head. The use of the same or similar self-tapping screw in bolt form, with a properly designed nut, also attains these same advantages. The characteristic of straight and easy starting of my novel self-tapping screw or bolt can be even further improved by the provision of tapered holes in the bodies or nuts with which they are used.

Incidental advantages of the long gradual taper include the feasibility of using more nearly constant hole sizes in thick material, and the ability for the screw to be removed and reinserted with little or no loss in the final thread friction which tends to hold the screw against loosening, particularly where the screw is used with a slotted nut.

It will be apparent from the examples given that many detailed modifications can be made in both the screw and the nut without departing from the spirit and the essential features of my invention.

Having thus described my invention, I claim:

1. A bolt consisting of a hardened threaded screw part and an unthreaded, unhardened nut part, the hole in said nut part being tapered and having an entrance diameter larger than its mean diameter, and the stem of said screw part being tapered and having a tip diameter less than its mean major diameter.

2. A bolt as defined in claim 1 in which the sides of the hole in the nut part are tapered throughout.

3. A bolt as defined in claim 1 in which the taper of the screw part and of the nut part are substantially the same, at the point of initial thread contact, when the axes of both parts are substantially coincident.

4. A bolt comprising a screw part having a threaded main tapered portion, and a nut part having a hole tapering less than the taper of the main threaded portion of the screw part, said nut part being axially slit for a portion of its depth.

5. In combination, a screw having a threaded main tapered portion, and an unthreaded nut having a substantially cylindrical hole and which is axially slit from at least one end.

6. A bolt comprising a screw part having a threaded main tapered portion, and a nut part having a hole tapering more than the taper of the main threaded portion of the screw part, said nut part being axially slit from the face adjacent the smaller end of the hole.

7. A bolt as defined in claim 5 of which the nut part has an entrance diameter larger than the tip diameter of the screw part, but a diameter elsewhere which is smaller than the maximum major diameter of the screw part.

8. A bolt consisting of a screw part and a nut part, the screw part being tapered, threaded and hardened, the nut part being unthreaded, unhardened and its inner profile shaped approximately to fit the unthreaded screw blank in a relative position where the tip of said screw blank would project not more than one major diameter outside the nut part.

9. A bolt comprising in combination, an unthreaded nut and a self-tapping screw, the nut comprising a body of unhardened material having a hole tapered to an included angle of not more than 10° and an annular bevel at one end of the hole, the screw having a full threaded, tapered portion.

RALPH H. UPSON.